United States Patent

[11] 3,634,056

[72] Inventors Gene I. Thomasson
Chesterland;
Edward V. Parillo, South Euclid, both of Ohio
[21] Appl. No. 876,376
[22] Filed Nov. 13, 1969
[45] Patented Jan. 11, 1972
[73] Assignee General Electric Company

[54] QUARTZ-TO-METAL SEAL MANUFACTURE
4 Claims, 6 Drawing Figs.

[52] U.S. Cl............................................... 65/42,
29/472.9, 65/59, 287/189.365
[51] Int. Cl........................................................ C03c 27/02
[50] Field of Search............................................ 65/59, 42;
287/189.365; 29/472.9

[56] References Cited
UNITED STATES PATENTS
2,659,964 11/1953 Power et al.................. 65/59 X
3,320,352 5/1967 Kershaw....................... 287/189.365 X Primary Examiner—S. Leon Bashore
Assistant Examiner—Saul R. Friedman
Attorneys—Otto Tichy, Henry P. Truesdell, Frank L. Neuhauser, Oscar B. Waddell and Joseph B. Forman ABSTRACT: An assembly is formed of an outer tubular silica member having therein an inner tubular silica member which has an open end fused to the inner wall of the outer member - and a closed end in the form of a reentrant dimple having a thinned-out annular area of weakness in its sidewalls, a thin-walled molybdenum cup is inserted over the inner member into the annular space between said outer and inner members, the walls of said outer and inner members are fused to embed and hermetically seal the walls of the cup therebetween, and the closed end of the dimple is tapped with a small rod inserted through a hole in the closed end of the cup to break out the end of the dimple at its thin sidewalls.

PATENTED JAN 11 1972

3,634,056

Inventors:
Gene I. Thomasson
Edward V. Parillo
by Otto Fichny
Their Attorney

QUARTZ-TO-METAL SEAL MANUFACTURE

This invention relates to the manufacture of seals of quartz-to-metal for electrical devices such as electric lamps.

Where high current-carrying capacity is required, it has been proposed to provide seals of the type comprising an essentially fused silica or quartz stem tube member which is hermetically sealed to a cup or thimble of molybdenum having a thinned or feathered sealing edge embedded in the wall of the stem tube, and wherein a relatively heavy current conductor or rod extends through the cup or thimble. A pair of such stems may be sealed to openings in a quartz envelope with the current-carrying rods extending into the envelope where they support and are electrically connected to a light source which may consist of an incandescible filament or a pair of electrodes. It will be understood that as used herein, the terms essentially fused silica and quartz are used interchangeably and include generally equivalent quartzlike materials such as that designated as 96 percent silica glass and sold under the name Vycor.

It is an object of the invention to provide a method of manufacture which results in seals of high quality while also providing ease and accuracy of fabrication. The novel features and advantages of the invention will appear from the following detailed description and from the drawing wherein.

Figure 1:
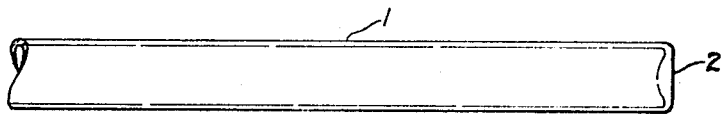
FIG. 1 is a side view of a length of fused silica stock tubing which has been closed at one end preparatory to the formation of an inner member or portion of a stem tube.

As shown in FIG. 1, a length of essentially fused silica or quartz stock tubing 1 is heated and reshaped to close one end 2 thereof.

Figure 2:
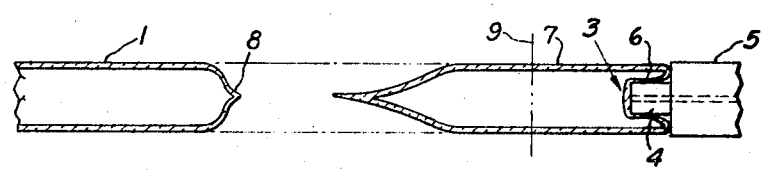
FIG. 2 is a side view, in section, showing the shaping of a reentrant dimple portion at the closed end of the stock tubing and the severance of the stock tubing for formation of an individual inner stem tube member.

The said tube end 2, while still plastic is then reshaped to form a reentrant dimple portion 3 as shown in FIG. 2. The dimple 3 may quickly and easily be formed by thrusting along the axis of tube 1 and against its closed end 2, the forward reduced diameter nose portion 4 of a tool 5, which also constitutes a vacuum chuck, and with the annular end of the chuck around said nose portion engaging the end of the tube 1. The sidewalls 6 of the dimple 3 are thereby stretched and thinned out to form an annular zone of weakness which is readily broken out as explained hereinafter.

The stock tubing 1 is then heated and softened at a narrow area spaced back from its closed end, and the portion of tube 1 to the right of the softened area is pulled away to close and separate the said main portion 1 from the remainder 7 (FIG. 2) which is to constitute an inner tubular member. The drawn out closed end 8 of the tube 1 is subsequently reheated and reshaped to form the generally flattened closed end shape 2 of FIG. 1 preparatory to forming another inner tubular member 7. The said member 7 is severed along the broken line 9 in FIG. 2 to leave the said inner tubular member with an open left hand end.

Figure 3:
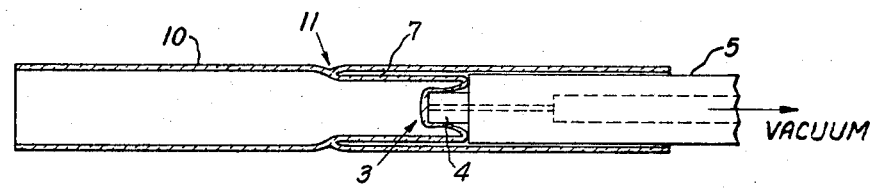
FIG. 3 is a side view, in section, illustrating the step of fusing the open end of the inner tube member to a portion of the inner wall of an outer tube member of the stem.

As shown in FIG. 3, the inner tubular member 7 is inserted into an outer tubular member 10 of essentially fused silica, and heat is applied to the outer member 10 at the area 11 to fuse the open end of inner tube 7 to the inner wall of outer member 10. During this step, the vacuum chuck 5, which was used as a tool to form the dimple 3, may conveniently be used to support the inner member 7 concentrically within the outer member 10 by engagement of the nose portion 4 of the chuck with the interior of the said dimple 3. The outer tube 10 is, at the same time, supported at each end and rotated synchronously by respective chucks on a lathe, the vacuum chuck extending through the right hand chuck and supported and rotated synchronously by a separate chuck.

Figure 4:
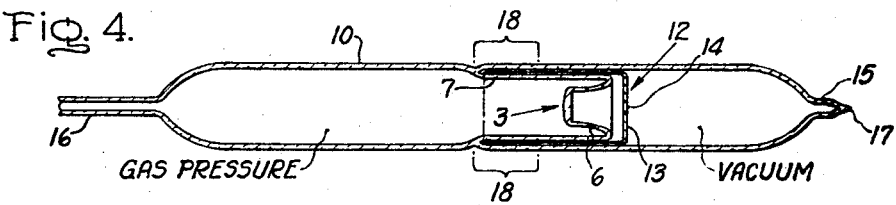
FIG. 4 is a side view, in section, of the assembly of the molybdenum cup member with the silica tube portions of the stem tube preparatory to fusion together of the assembly.

As shown in FIG. 4, a deep elongated molybdenum cup 12 is inserted with its thin sidewalls in the annular space between inner and outer tubes 7 and 10. The cup 12 has a relatively thick end wall 13 with a central aperture 14 therein, and its sidewalls taper down in thickness to an extremely thin feather edge at its open end. By way of example only, a cup of approximately one-half inch diameter and 1 inch length may have an end wall 13 about 0.020 inch thick with the walls tapering rapidly in thickness from about 0.010 inch to 0.005 inch close to the end wall and thereafter tapering gradually to about 0.0003 inch at the edge.

In accordance with preferred practice, during the sealing of the cup 12 into the stem tube assembly 7 and 10, the right hand end of the assembly is evacuated and the left hand end is pressurized, as explained in detail in U.S. Pat. No. 3,320,352 to D. D. Kershaw. By way of example only, the ends of the outer tube 10 may be tubulated as shown at 15 and 16, the right hand end may be evacuated to about $1 \times 10^{+3}$ Torr pressure and tipped off at 17, after which the assembly may be replaced in the lathe with opposite ends of the outer tube 10 held in respective chucks and the tubulation 16 connected to a source of gas pressure (nitrogen, for example) at a pressure of about 3 pounds per square inch gauge pressure. As the assembly is rotated, gas fires are applied over the area indicated by the brackets 18 to form the seal shown in FIG. 5 by fusing the walls of respective tubes 7 and 10 to the inner and outer walls of the thin portion of the cup 12 against which the respective tube walls 7 and 10 are pressed by the gas pressure inside tube 7 and by atmospheric pressure on the exterior of tube wall 10. To limit the seal area to that portion of the cup 12 which has been thinned down, the remainder of the outside of the cup may be coated with zirconium oxide powder, for example.

Figure 5:
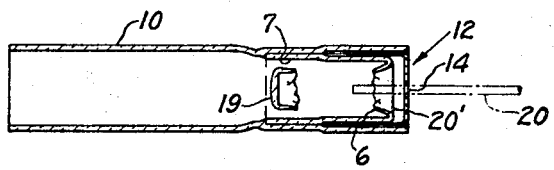
FIG. 5 is a side view, in section, of the stem, illustrating severing and separation of the closed end of the dimple portion of the inner tubular member of the stem.

The ends of the outer tube 10 are severed to leave the length of the stem tube as seen in FIG. 5. Also as illustrated in FIG. 5, an end wall portion 19 of the dimple 3 is broken away along the thin zone of weakness 6 by tapping the said end wall lightly with a small rod (indicated at 20) inserted through the hole 14 in the cup 12. The fracture has no tendency to propagate over the rim 20' of the dimple into the seal area, as it does when the closed end of the inner tube 7 is formed to a simple convex dome shape instead of the reentrant dimple shape 3.

Figure 6:
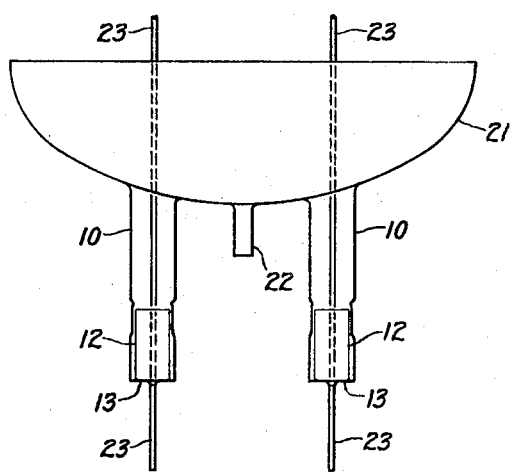
FIG. 6 is an elevation showing one arrangement of a pair of stem tube assemblies attached to a silica base member which constitutes part of a bulb or envelope of an electric lamp.

As shown in FIG. 6, in one application of the sealed stem tubes 10, a pair of them are fused to respective openings in a dish or cup-shaped base member 21 of fused silica which also has an exhaust tube 22 fused to a central opening therein. Rigid lead-in conductors or rods 23 are inserted to extend through respective stem tubes 10 and through the openings 14 in the bases 13 of the cups 12. The rods 23 are made of a suitable refractory material such as tungsten and they may be secured in the openings 14 of the molybdenum cups 12 by a suitable brazing material such as nickel.

A suitable light source, which may be a tungsten filament of the well-known planar type, is supported from and between the conductors 23 in known manner, after which a fused silica bulb or envelope is mounted to enclose the light source with an open neck or end portion of the bulb fused to the rim of the base member 21. The bulb may then be evacuated and filled with a suitable inert gas along with a small proportion of a halogen such as bromine, in the form of hydrogen bromide for example, and which functions as a regenerative getter in known manner. If needed, supplementary support for the conductors 23 may be provided, for example, by collar or disc members in the stem tubes 10.

The stock tubing 1 (FIGS. 1 and 2) from which the inner tubular member 7 is made, may be made of the so-called 96 percent silica glass (Vycor) which has a softening temperature approximately 150° C. lower than the softening temperature of pure fused silica or quartz of which the outer tubular member 10 is preferably made. This facilitates fusion of the said inner member 7 by heat transmitted thereto by heating of the outer member 10.

Instead of tubulating the ends of outer tube 10 as illustrated in FIG. 4, the lathe in which the ends of the tube 10 are held for the operation described in connection with FIG. 3, may be provided with collet chucks through which the opposite ends of the tube 10 may be evacuated and pressurized.

What we claim as new and desire to secure by Letters Patent of the United States is:

1. The method of making a seal of molybdenum to essentially fused silica which comprises forming an assembly of an outer tubular silica member having therewithin an inner tubular silica member of slightly smaller diameter having an open end fused at its edge to the inner wall of the outer member and a closed end in the form of a reentrant dimple portion having a thinned-out annular area of weakness in its sidewalls, inserting a molybdenum cup with extremely thin walls at its open end in the annular space between said inner and outer silica members, fusing the walls of said inner and outer silica members to embed and form a hermetic seal with the inner and outer surfaces of the thin walls of said cup, and striking the closed end of said dimple portion through a central opening in the closed end of said cup to break out the said closed end of the dimple at its annular area of weakness.

2. The method of claim 1 wherein the inner tubular silica member is prepared by heating to a plastic condition a closed end of a silica tube, thrusting along the axis of said tube and against the said plastic closed end thereof the forward end of a reduced diameter nose portion of a vacuum chuck to thereby form the reentrant dimple portion with thinned out sidewalls, and using the said vacuum chuck to hold the said inner tubular silica member at a desired location within and concentric with the outer tubular silica member while fusing the open end of the inner tubular member to the inner wall of the outer member.

3. The method of claim 2 wherein, during the fusing of the walls of said inner and outer tubular silica members to form a hermetic seal with the walls of said cup, the interior of that end of the outer tubular silica member which contains the said cup is under a vacuum while the other end of the outer tubular silica member is under pressure so that the fused walls of said inner and outer tubular silica members are compressed against the respective inner and outer surfaces of the walls of said cup.

4. The method of claim 1 wherein, during the fusing of the walls of said inner and outer tubular silica members to form a hermetic seal with the walls of said cup, the interior of that end of the outer tubular silica member which contains the said cup is under a vacuum while the other end of the outer tubular silica member is under pressure so that the fused walls of said inner and outer tubular silica members are compressed against the respective inner and outer surfaces of the walls of said cup.

* * * * *